INVENTOR:
Manfred Matzl

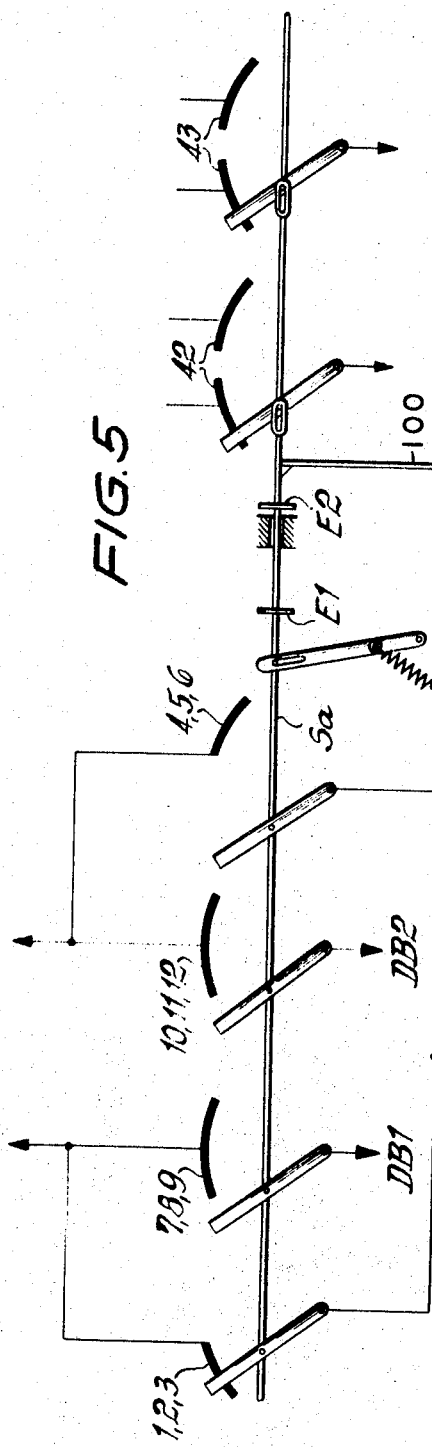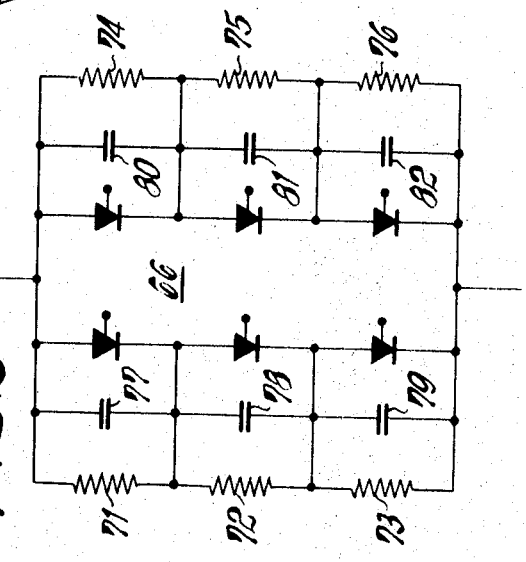

3,534,246
TAP-CHANGING SYSTEM INCLUDING THYRISTORS FOR EFFECTING TAP-CHANGES IN THREE-PHASE TRANSFORMERS

Manfred Matzl, Pendelhofweg 75½, Regensburg-Zeitlarn, Germany
Filed Nov. 26, 1968, Ser. No. 779,124
Claims priority, application Germany, Dec. 6, 1967, 1,638,480
Int. Cl. G05f 1/14
U.S. Cl. 323—43.5                 10 Claims

ABSTRACT OF THE DISCLOSURE

A tap-changing system for three-phase transformers is provided with circuitry—including a pair of three-phase diode rectifier bridges—adapted to minimize the number of load current thyristors required to effect tap-changes. In the limit case but a single load current thyristor is required to effect three-phase tap-changing operations.

BACKGROUND OF INVENTION

This invention pertains to tap-changing systems of the kind wherein tap-changes can be performed under load without occurrence of arcing between relatively movable contacts. This is achieved by the application of thyristors and of diodes.

Tap-changing systems of the aforementioned character require generally a large number of thyristors. A three-phase system may require two back-to-back or inverse parallel connected pairs of thyristors in each phase of the three-phase circuit or, in other words, a total of twelve thyristors. In such a system the number of thyristors may be reduced by establishing a short-circuit current path between contiguous taps by mechanical switching means and interrupting said current path by a thyristor operatively related to a forced commutation circuit. The aforementioned tap-changing system when combined with such means would still call for the provision of at least six load current thyristors. This number of thyristors is undesirably high, and may be intolerable.

In order to provide three-phase tap changing systems which are controlled by semiconductor devices it is vitally important to drastically reduce the number of such devices therein. This applies particularly in regard to tap-changing systems involving three phases.

SUMMARY OF INVENTION

Three phase tap-changing regulating transformers according to this invention include three tapped transformer windings each having a plurality of taps. Three conductor means are connected to establish a Y-connection between three corresponding taps of said windings and to establish a neutral point. Three additional conductor means are connected to establish a Y-connection between three other corresponding taps of said three windings and to establish a neutral point. The circuitry further includes a first group of cooperating separable pairs of load-current-carrying contacts including three pairs of contacts each interposed in one of said three conductor means and a second group of cooperating separable pairs of load-current-carrying contacts including three pairs of contacts each interposed in one of said three additional conductor means. The circuitry further includes a first three phase diode rectifier bridge circuit having three A-C input terminals each adapted to be conductively connected to one of said three corresponding taps of said windings and having D-C output terminals and a second three-phase diode rectifier bridge circuit having three A-C input terminals and adapted to be conductively connected to one of said three other corresponding tape of said three windings, and having D-C output terminals. A first pair of additional serially connected diodes interconnects said D-C output terminals of said first diode bridge circuit, and a second pair of additional serially connected diodes interconnects said D-C output terminals of said second rectifier bridge circuit. The circuitry further includes conductors for connecting a point situated between said first pair of additionally diodes and conductors for connecting a point situated between said second pair of additional diodes to said neutral point. A first switch means is provided for conductively interconnecting said D-C terminals of said first rectifier bridge circuit, and a second switch means is provided for conductively interconnecting said D-C terminals of said second rectifier bridge circuit. At least one of said switch means is a load current thyristor, a current-limiting choke being connected in series with said load current thyristor. The circuitry further includes means for controlling said first switch means and means for controlling said second switch means to establish a short-circuit across a portion of each of said windings situated between one of said three corresponding taps and one of said three additional corresponding taps. In addition to the above the circuitry includes a forced commutation circuit for forcing the current in said load thyristor down to zero. Said forced commutation circuit includes an auxiliary thyristor, a commutation capacitor, and a second current-limiting choke connected in series with said auxiliary thyristor and said commutation capacitor.

BRIEF DESCRIPTION OF DRAWINGS

FIG. 4 shows diagrammatically a modified detail of a circuit according to FIG. 3 including a bounceless mechanical switch;

FIG. 5 is a diagrammatic representation of an operating mechanism for performing the switching operations required by the systems shown in FIGS. 1 to 3, inclusive, in the required sequence; and FIG. 6 is a circuit diagram of a load thyristor network that may be combined with the circuitry of FIGS. 1 to 3, inclusive.

DESCRIPTION OF PREFERRED EMBODIMENTS OF THE INVENTION

Figure 1:
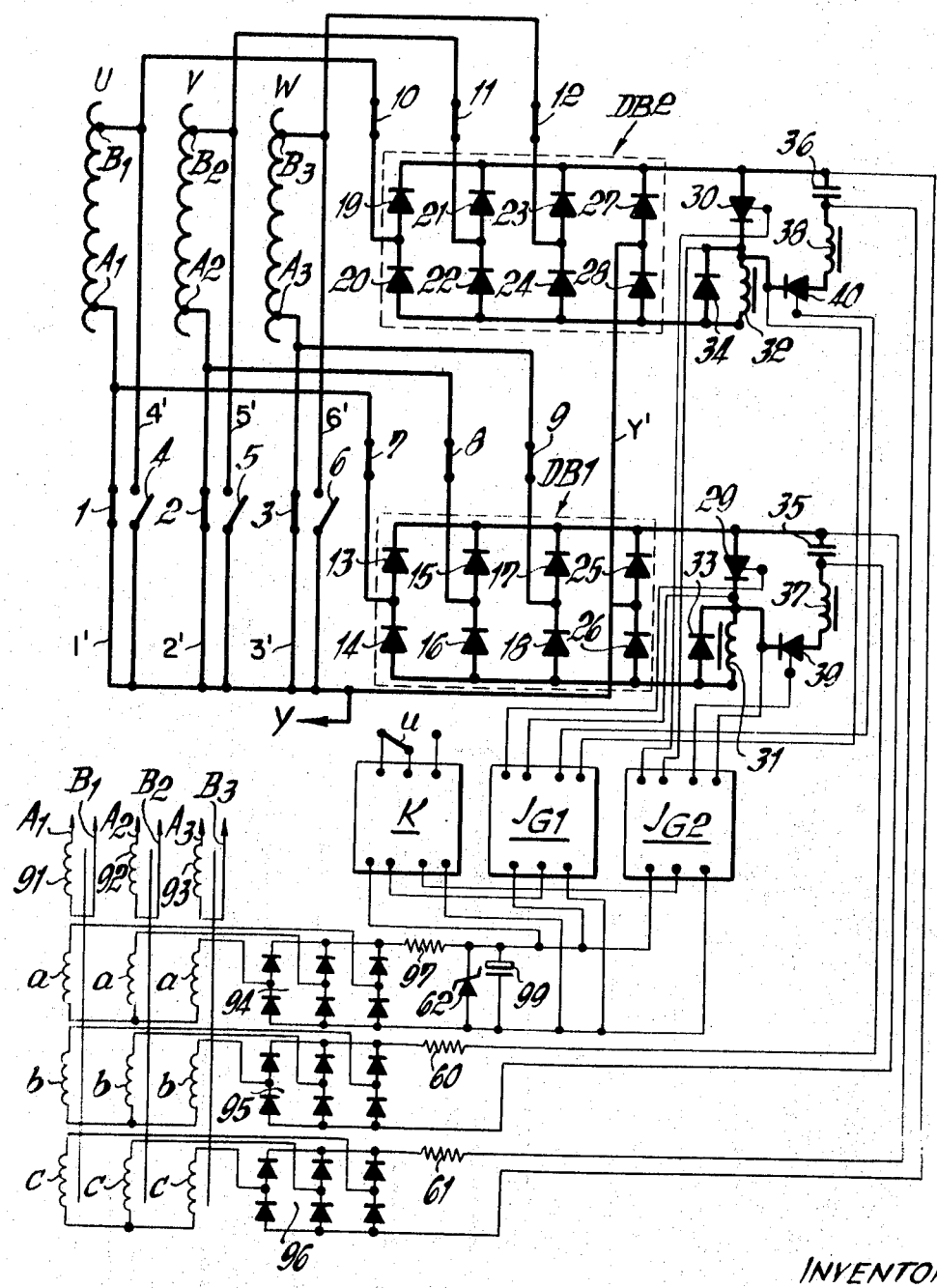
FIG. 1 is a circuit diagram of a system embodying this invention for effecting tap-changes in three-phase transformers, which system includes two three-phase diode rectifier bridge circuits with connected load thyristor circuits and turn-off circuits.

Reference characters U, V, W, have been applied to indicate portions of three tapped transformer windings pertaining to a three-phase transformer. Winding U is provided with taps A1, B1, winding V is provided with taps A2, B2, and winding W is provided with taps A3, B3. Reference character Y has been applied to indicate an outgoing line. Taps A1, A2, A3 may be conductively connected to outgoing line Y by pairs of current-carrying contacts, or current-carrying switches 1, 2, 3 interposed in conductors 1', 2', 3', and taps B1, B2, B3 may be conductively connected to outgoing line Y by current-carrying contacts, or current-carrying switches 4, 5, 6 interposed in conductors 4', 5', 6'. Reference character DB1 has been applied to generally indicate a three-phase diode rectifier bridge arranged parallel to the pairs of current-carrying contacts, or current-carrying switches 1, 2, 3, and reference character DB2 has been applied to generally indicate a three-phase diode rectifier bridge arranged parallel to the pairs of current-carrying contacts, or current-carrying switches 4, 5, 6. Disconnects 7, 8, 9 are interposed in lines extending between taps A1, A2, A3 and the A-C input terminals of rectifier bridge DB1, and disconnects 10, 11, 12 are interposed in lines extending between taps B1, B2, B3 and the A-C input terminals of rectifier bridge DB2. Rectifier bridge DB1 includes the six diodes 13, 14, 15, 16, 17, 18, and rectifier bridge DB2 includes the six diodes 19, 20, 21, 22, 23, 24. Rectifier bridge DB1 further includes the additional pair of diodes 25, 26 connected in the same way as its other diodes, except for the fact that the point between the anode of diode 25 and the cathode of diode 26 is conductively connected by a lead Y' to the outgoing line Y. Diode bridge DB2 includes the additional pair of diodes 27, 28 connected in the same way as its other diodes, except for the fact that the point between the anode of diode 27 and the cathode of diode 28 is conductively connected by a lead Y to the outgoing line Y. The D-C output terminals of rectifier bridges DB1, DB2 are the terminals thereof at their right side, as seen in FIG. 1. The D-C output circuit of rectifier bridge DB1 includes a series arrangement of a load-thyristor 29 and a choke 31, and in a like fashion the D-C output circuit of rectifier bridge DB2 includes a series arrangement of a load thyristor 30 and of a choke 32. Choke 32 is shunted by a diode 33, and choke 32 is shunted by a diode 34. Load thyristor 29 is shunted by a commutating or turn-off circuit including turn-off capacitor 35, choke 37, and auxiliary thyristor 39 which circuit elements are connected in series. In like fashion load thyristor 30 is shunted by a turn-off circuit including turn-off capacitor 36, choke 38, and auxiliary thyristor 40, which circuit elements are connected in series.

Reference character K has been applied to indicate a bistable circuit and reference characters JG1 and JG2 have been applied to indicate circuits for generating trigger pulses for the thyristors shown in the circuitry of FIG. 1. The devices K, JG1, and JG2 have been disclosed in considerable detail in the copending patent application of Manfred Matzl, filed Feb. 28, 1967, Ser. No. 619,228 for Tapped Regulating Transformers Having Thyristor Transfer Means assigned to the same assignee as the present invention, now U.S. Pat. No. 3,437,913, issued Apr. 8, 1969, and reference may be had to this application and patent for details regarding building blocks K, JG1 and JG2 deleted in this context to avoid a duplication of information regarding these building blocks.

As shown in FIG. 1 the devices K, JG1 and JG2 and the commutation capacitors 35, 36 are energized by a power supply including an auxiliary transformer having three primary windings 91, 92, 93. The ends of winding 91 are conductively connected to the taps $A_1$, $B_1$ of phase winding U, and this has been indicated in FIG. 1 by applying the reference characters $A_1$, $B_1$ to the ends or terminals of transformer winding 91. In a like fashion the ends of winding 92 are conductively connected to the taps $A_2$, $B_2$ of phase winding V, and the ends of winding 93 are conductively connected to the taps $A_3$, $B_3$ of phase winding W. Reference characters $A_2$, $B_2$, $A_3$, $B_3$ applied to the ends or terminals of winding 92 and 93 indicate which of the ends thereof are connected to the taps to which the same reference characters have been applied. Each primary winding 91, 92, 93 of the power supply transformer is operatively related to three secondary windings, a, a, a; b, b, b; c, c, c. Windings a, a, a are conductively connected to the A-C input terminals of a three-phase rectifier bridge 94. Windings b, b, b are conductively connected to the A-C input terminals of three-phase rectifier bridge 95, and windings c, c, c are conductively connected to the A-C input terminals of three-phase rectifier bridge 96. The D-C output circuit of bridge 94 includes a resistor 97, a capacitor 99, and a Zener diode 62 which are well known means for limiting ripple and maintaining the output voltage at a predetermined level. The D-C output circuit of bridge 95 includes the resistor 60 and the D-C output circuit of bridge 96 includes the resistor 61. As shown in FIG. 1 bridge 94 is connected to energize the devices K, JG1 and JG2 which generate the thyristor triggering pulses. As mentioned above these devices have been disclosed in considerable detail in my copending patent application Ser. No. 619,228, filed Feb. 28, 1967, for Tapped Regulating Transformer Having Thyristor Transfer Switch Means. The bistable device K is provided with change-over switch u for change from one stable condition thereof to the other stable condition thereof. Change-over switch u may be operated following any tap-changing operation by a spring motor or the like as shown in FIG. 5 and described below more in detail. The devices JG1 and JG2 under control of bistable circuitry K generate trains of pulses for triggering thyristors 29 and 30 and the single pulses for triggering the commutation or turn-off thyristors 39 and 40, as set forth in the above referred-to patent application and patent, respectively.

Figure 2:
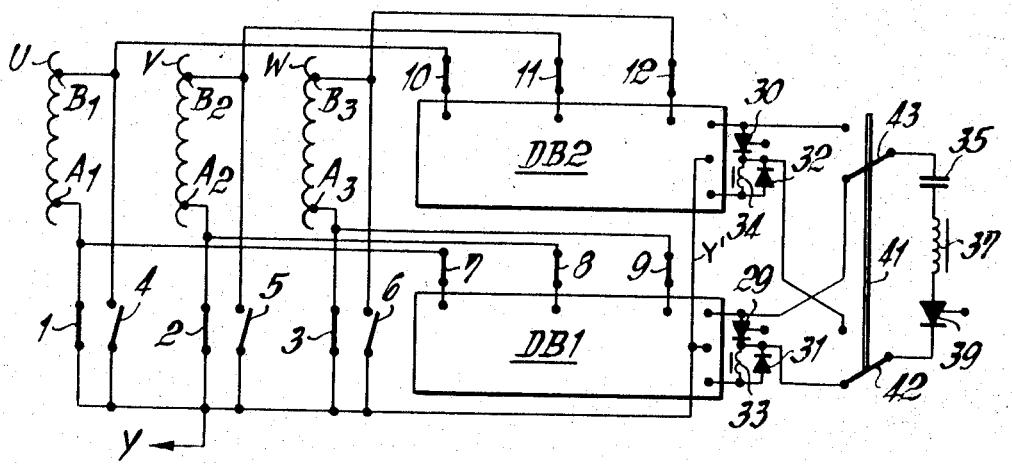
FIG. 2 is a circuit diagram of a circuit which is substantially the same as that shown in FIG. 1, except that it includes but one single turn-off circuit which can be selectively related to either of both three-phase diode rectifier bridges by means of a change-over switch.

The circuitry of FIG. 2 is very similar to the circuitry of FIG. 1 and the same reference characters have been applied in both figures to indicate like parts. In view thereof FIG. 2 calls for a detailed description only to the extent that the circuitry shown therein differs from that shown in FIG. 1 and described in connection with FIG. 1. The three tapped transformer windings U, V, W having corresponding taps A1, A2, A3 and B1, B2, B3, respectively, are adapted to be conductively connected by pairs of current-carrying contacts, or current-carrying switches 1, 2, 3 and 4, 5, 6, respectively, to outgoing line Y, and may be connected by disconnects 7 to 12 to three-phase rectifier bridge circuits DB1 and DB2. These bridge circuits are identical to the three-phase rectifier bridge circuits DB1 and DB2 of FIG. 1. The circuitry of FIG. 2 differs from that of FIG. 1 in that the former includes but one single commutating or turn-off circuit 35, 37, 39, while the circuitry of FIG. 1 includes, in addition to the commutating or turn-off circuit 35, 37, 39, the commutating or turn-off circuit 36, 38 and 40. The circuitry of FIG. 2 further includes a change-over switch having four fixed contacts and a pair of cooperating movable contacts 42, 43 which are mechanically interconnected for joint movement by tie bar 41. In the position of tie bar 41 and of contacts 42, 43 shown in FIG. 2 parts 35, 37 and 39 are shunted across load thyristor 29. If tie bar 41 and contacts 42, 43 are moved from their lower limit position shown in FIG. 2 to their upper limit position, parts 35, 37 and 39 are shunted across load thyristor 30 rather than across load thyristor 29. Thus one single commutating or turn-off circuit may be used selectively for turning-off either load thyristor 29 or load thyristor 30.

Figure 3:
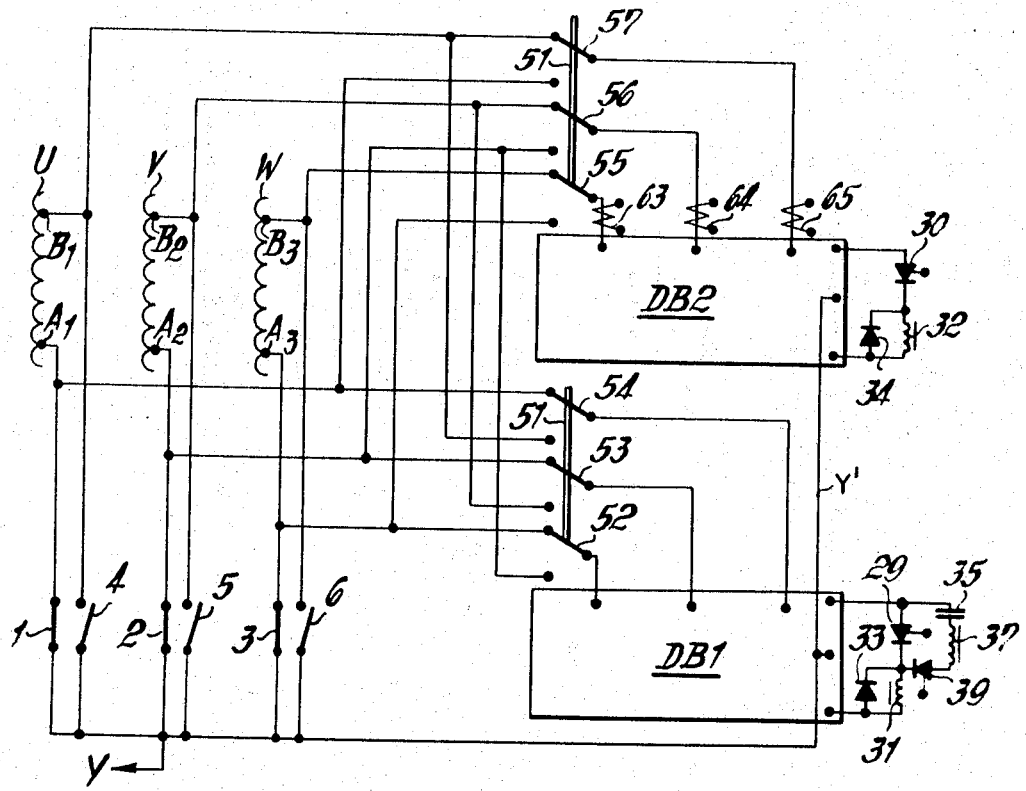
FIG. 3 is a circuit diagram of a tap-changing system for three-phase transformers including a first three-phase diode rectifier bridge circuit operatively related to a load thyristor without a turn-off or commutating circuit and a second three-phase diode rectifier bridge circuit operatively related to a load thyristor having a turn-off or commutating circuit, the circuitry of FIG. 3 further including a change-over switch for selectively operatively relating said first rectifier bridge and said second rectfier bridge to different taps of three transformer winding.

In FIG. 3 the same reference characters as in FIGS. 1 and 2 have been applied to designate like parts. Thus U, V, W are three transformer windings tapped at A1, A2, A3 and B1, B2, B3. Taps A1, A2, A3 are conductively connected to pairs of current-carrying contacts or switches 1, 2, 3 which are, in turn, conductively connected to outgoing line Y. Taps B1, B2, B3 are conductively connected to pairs of current-carrying contacts or switches 4, 5, 6 which are, in turn, conductively connected to outgoing line Y. The two three-phase diode rectifier bridge circuits DB1 and DB2 are identical to the two three-phase diode rectifiers bridge circuits shown in FIG. 1 to which the same reference characters have been applied. Rectifier bridge circuit DB1 is provided with load thyristor 29, series choke 31 and the choke-shunting diode 33, and rectifier bridge DB2 is provided with load-thyristor 30, series choke 32 and the choke-shunting diode 34. Load thyristor 29 is operatively related to a commutating or turn-off circuit including capacitor 35, choke 37, and turn-off thyristor 39. Load thyristor 30 is not operatively related to a commutating or turn-off circuit. The provision of a commutating or turn-off circuit has been dispensed with on account of the provision of a system of change-over switches including the six movable contacts 52, 53, 54, 55, 56, 57 tied together for joint movement by transverse tie bar 51. It will be noted that tie bar 51 is shown in FIG. 3 for the sake of clarity to be broken off in its center region. Each movable contact 52, 53, 54, 55, 56, 57 cooperates selectively with a pair of fixed contacts and has an upper limit position and a lower limit position. In the upper limit position of movable switch contacts 52, 53, 54, 55, 56, 57 taps A1, A2, A3 are conductively connected to the A-C input terminals of rectifier bridge circuit DB1, and taps B1, B2, B3 are conductively connected to the A-C input terminals of rectifier bridge circuit DB2. In the lower limit position of the movable switch contacts 52, 53, 54, 55, 56, 57 the taps A1, A2, A3 are conductively connected to rectifier bridge circuit DB2 and the taps B1, B2, B3 are conductively connected to rectifier bridge circuit DB1. In the upper limit position of change-over switch 51, 52, 53, 54, 55, 56, 57 its contacts 52, 53, 54 and rectifier bridge circuit DB1 shunt the pairs of current-carrying contacts, or current-carrying switches 1, 2, 3. In the lower limit position of change-over switch 51, 52, 53, 54, 55, 56, 57 its contacts 52, 53, 54 and rectifier bridge circuit DB1 shunt the pairs of current-carrying contacts, or current-carrying switches 4, 5, 6. For a better understanding of this shunting action reference may be had to FIG. 1 which shows that the point between the anode of diode 25 and the cathode of diode 26 is conductively connected by conductor Y' to line Y which connection has also been indicated in FIG. 3 by reference character Y'.

FIG. 3 shows further three current transformers 63, 64, 65 of which each is operatively related to one of the leads conductively connecting taps B1, B2, B3 to the A-C input terminals of rectifier bridge circuit DB2. These current transformers are not required in the circuitry of FIG. 3 unless modified as will be explained below in connection with FIG. 4.

The circuitry of FIG. 3 may be modified by deleting load thyristor 30 and choke 32 and substituting therefor a mechanical switch having a pair of cooperating relatively movable contacts and provided with means for preventing, or minimizing, contact bounce. This modification of the system of FIG. 3 has been shown in FIG. 4 wherein reference numeral 58 has been applied to indicate the aforementioned switch which prevents, or minimizes, contact bounce.

The modification of the circuitry of FIG. 3 shown in FIG. 4 makes it possible to dispense with the pulse generator JG2 of FIG. 1. The current transformers 63, 64, 65 of FIG. 3 form part of a circuitry for determining the closing time of switch 58 of FIG. 4. The entire circuitry for determining the closing time of switch 58 has been described in considerable detail in my copending patent application Ser. No. 708,085, filed Feb. 26, 1968 for Tap-Changing Thyristor Circuitry for Regulating Transformers, assigned to the same assignee as the present application.

Reference may be had to this application and patent for details in regard to the control means for switch 58 of FIG. 4.

Referring now again to FIG. 1, the mode of operation of the system shown therein will now be described.

In the position of the pairs of current-carrying contacts, or switches 1, 2, 3 shown in FIG. 1 these pairs of contacts or switches are closed and carry the full load current. Reference character Y has been applied to the outgoing line to indicate that the transformer windings U, V, W are Y connected, thus establishing a neutral point. The load current is derived from taps A1, A2, A3. Assuming now that it is desired to effect a change from taps A1, A2, A3 to taps B1, B2, B3. To initiate such a tap changing operation, disconnects 7 to 12, inclusive, are being closed and the load thyristor 29 in the D-C output circuit of rectifier bridge circuit DB1 is triggered. Thereafter the pairs of current-carrying contacts or switches 1, 2, 3 are being opened. This establishes a new current path from tap $A_1$ to tap $A_2$ and from tap $A_1$ to the neutral point Y of the system. The current path from tap $A_1$ to tap $A_2$ includes disconnect switch 7, diode 13, load thyristor 29, current-limiting choke 31, diode 16 and disconnect switch 8. The current path from tap $A_1$ to the neutral point Y of the circuit includes circuit elements 7, 13, 29 and 31 and diode 26. Like current paths are established for all currents flowing between taps $A_1$ to $A_3$ and currents between the taps and the neutral point Y of the system.

The next step consists in triggering of thyristor 30 forming part of bridge circuit DB2. This establishes a three-phase short-circuit which is limited by the inductance of the circuit. To be more specific, taps $A_1$, $B_1$ are short-circuited. Taps $A_2$, $B_2$ are short-circuited, and taps $A_3$, $B_3$ are short-circuited, the amount of the short-circuit current being limited by choke 32. Now auxiliary thyristor 39 of three-phase bridge circuit DB1 is triggered. This occurs at a point of time significantly before the short-circuit currents in the short-circuited portions of windings U, V, W reach the peak value of the available short-circuit currents. Triggering of auxiliary thyristor 39 causes the pre-charged commutating capacitor 35 to discharge, the current path of this discharge including the current-limiting choke 37, the load current thyristor 29, and the auxiliary thyristor 39. The direction of the discharge current of commutating capacitor 35 is opposite to the direction of the flow of the load current supplied by the transformer windings U, V, W. When the discharge current of the commutating capacitor 35 and the load current are equal, i.e. when the resulting current is zero, the load current thyristor begins to block the flow of current, a negative blocking potential being applied to this thyristor. The magnitude of this potential depends upon several factors, including the voltage to which capacitor 35 has been pre-charged.

The potential between short-circuited taps and the inductance inherent in the circuit establish a tendency of continued flow of the load current plus the short-circuit current and of reversal of the charge of commutating or turn-off capacitor 35. As is well known in the art the circuit turn-off time, i.e. the turn-off time that the circuit presents to the thyristor must always be greater than the turn-off time of the thyristor, i.e. the shortest interval between the time when forward current reaches zero and the time when the thyristor is able to block reapplied forward voltage without turning on, which condition must be met in the circuitry of FIG. 1.

The current-limiting choke 31 arranged in series with thyristor 29 precludes a discharge of commutating capacitor 35 across diodes 13 to 18 and across diodes 25 and 26 following triggering of auxiliary thyristor 39.

The diode 33 which is arranged parallel to choke 31 makes it possible to dissipate the energy which is stored in choke 31.

When thyristor 29 in bridge circuit DB1 safety blocks, the co-operating pairs of contacts 4, 5, 6 are closed and the trigger pulses taken away from thyristor 30 of three-phase bridge circuit DB2. This completes the tap-changing operation from taps $A_1$, $A_2$ and $A_3$ to taps $B_1$, $B_2$ and $B_3$, and disconnects 7 to 12, inclusive, may now be opened.

The tap-changing operation from taps $B_1$, $B_2$ and $B_3$ to taps $A_1$, $A_2$ and $A_3$ is analogous to the tap-changing operation which has been described above, and hence does not call for a statement of its constituent steps.

In FIG. 2 the blocks DB1 and DB2 indicate three-phase bridge circuits identical to the bridge circuits DB1 and DB2 illustrated in FIG. 1 and described in connection with FIG. 1 in considerable detail. The circuitry of FIG. 2 differs from that of FIG. 1 in that the former includes but one single forced commutation circuit which is made up of the commutation capacitor 35, the current-limiting choke 37 and the auxiliary thyristor 39, these three circuit elements being connected in series. The change-over switch 41, 42, 43 makes it possible to connect circuit elements 35, 37, 39 selectively either across thyristor 29 of bridge circuit DB1, or across thyristor 30 of bridge circuit DB2. In FIG. 2 the circuit elements 35, 37 and 39 are shown to be connected across thyristor 29 of bridge circuit DB1. Circuit elements 35, 37 and 39 must be operatively related by change-over switch 41, 42, 43 to the particular bridge circuit (in the instant case bridge circuit DB1) which must carry the load current that has been carried before by the load current-carrying pairs of contacts about to separate (which are, in the instant case, the load current-carrying pairs of contacts 1, 2 and 3, considering a tap-changing operation from taps $A_1$, $A_2$, $A_3$ to taps $B_1$, $B_2$, $B_3$). Considering now a tap-changing operation from taps $B_1$, $B_2$, $B_3$ to taps $A_1$, $A_2$, $A_3$, then change-over switch 41, 42, 43 must be moved to the upper limit position thereof, i.e. to the upper position of contacts 42 and 43 so that serially connected circuit elements 35, 37 and 39 are connected across load thyristor 30. The change of position of change-over switch 41, 42, 43 is effected prior to opening or separation of the pairs of load current-carrying contacts 1, 2, 3, or the load current carrying contacts 4, 5, 6, respectively.

It will be apparent that the circuitry of FIG. 2 requires fewer circuit elements since the forced commutation circuit 35, 37, 39 is common to both thyristors 29, 30, or common to both bridge circuits DB1 and DB2.

In FIG. 3 the bridge circuits DB1 and DB2 of FIG. 1 have been represented in block diagram form, and like reference characters as in FIG. 1 have been applied to designate like parts. FIG. 3 differs from FIG. 1 in that the system shown in the former figure includes but one single forced commutation circuit made up of a capacitor 35, a choke 37, and an auxiliary thyristor 39, these three circuit elements being connected in series. Circuit elements 35, 37 and 39 are connected across thyristor 29, and permanently operatively relates to bridge circuit DB1. The A-C input terminals of bridge circuit DB1 can be selectively conductively connected either to taps $A_1$, $A_2$, $A_3$, or to taps $B_1$, $B_2$, $B_3$, depending upon the position of change-over contacts 52, 53, 54. The A-C input terminals of bridge circuit DB2 can be selectively conductively connected to either taps $B_1$, $B_2$, $B_3$, or taps $A_1$, $A_2$, $A_3$, depending upon the position of change-over contacts 55, 56, 57. In the upper limit position of the change-over contacts the taps $A_1$, $A_2$, $A_3$ are conductively connected to the A-C input terminals of bridge circuit DB1, and the taps $B_1$, $B_2$, $B_3$ are conductively connected to the A-C input terminals of bridge circuit DB2. In the lower limit position of change-over switch tie bar 51 the A-C input terminals of bridge circuit DB1 are conductively connected to taps $B_1$, $B_2$, $B_3$, and the A-C input terminals of bridge circuit DB2 are conductively connected to taps $A_1$, $A_2$, $A_3$. In the circuitry of FIG. 3 the disconnects 7, 8, 9, 10, 11 and 12 of FIGS. 1 and 2 are not necessary and are dispensed with. The leads connecting change-over contacts 55, 56, 57 with the A-C input terminals of bridge circuit DB2 are operatively related to and energize current transformers 63, 64, 65.

If it is intended to change from taps $A_1$, $A_2$, $A_3$ to taps $B_1$, $B_2$, $B_3$, change-over bar 51 is moved to its lower position, thus causing bridge circuit DB1 to be shunted across load-current-carrying contacts 1, 2, 3 which are to be opened, or separated. On the other hand, if it is intended to change from taps $B_1$, $B_2$, $B_3$ to taps $A_1$, $A_2$, $A_3$ the change-over bar 51 is moved to its upper limit position, thus causing bridge circuit DB1 to be shunted across the load-current-carrying contacts 4, 5, 6 before the latter are opened, or separated.

It is possible to modify and simplify the system shown in FIG. 3 by deleting choke 32 and diode 34 and by substituting for the thyristor 30 a mechanical switch having minimal contact bounce, i.e. a so-called bounceless switch. Means to minimize contact bounce and switches having minimal contact bounce, are well known in the art, and do not call for detailed description in this context.

FIG. 4 shows the bridge circuit DB2 of FIG. 3 modified and simplified in the fashion set forth above. Reference character 58 has been applied in FIG. 4 to indicate the aforementioned switch having minimal contact bounce. Switch 58 is provided to short-circuit the portion of winding U between taps $A_1$, $B_1$, the portion of winding V between taps $A_2$, $B_2$, and the portion of winding W between taps $A_3$, $B_3$ for a very short period of time. The short-circuit current path is then interrupted as set forth above by the action of thyristor 29 and of forced commutating circuit 35, 37, 39.

Referring now to FIG. 5 which shows diagrammatically a composite switch mechanism for operating the various circuit elements of FIGS. 1 and 2 in their required sequence, reference character SpS has been applied to indicate an over-center spring mechanism for operating the operating rod Sa selectively from left to right, and from right to left. In FIG. 5 operating rod Sa is shown in its left limit position established by a movable abutment of dog $E_2$ engaging a fixed abutment forming a bearing for operating rod Sa. Operating rod Sa is provided with an abutment or dog $E_1$ which determines the right limit position of operating rod Sa when engaging its cooperating fixed bearing-like abutment.

In FIG. 5 the three pairs of current-carrying contacts 1, 2, 3 of FIGS. 1 and 2 have been represented by a single pair of contacts to which the reference characters 1, 2, 3 have been applied. In a like fashion, the pairs of current-carrying contacts 4, 5, 6 of FIGS. 1 and 2 have been represented by a single pair of contacts to which reference characters 4, 5, 6 have been applied. The three disconnects 7, 8, 9 of FIGS. 1 and 2 have been represented in FIG. 5 by a single disconnect to which reference characters 7, 8, 9 have been applied. In a like fashion, the disconnects 10, 11, 12 of FIGS. 1 and 2 have been represented in FIG. 5 by a single disconnect to which reference characters 10, 11, 12 have been applied. FIG. 5 further shows the contacts 42 and 43 of FIG. 2 adapted to be operated by operating rod Sa by the intermediary of two lost motion connections. A force-transmitting member 100 establishes a positive connection between switch rod Sa and change-over switch u of FIG. 1, i.e. the change-over switch of bistable system K.

Any tap-changing signal causes operating rod Sa to move from its left limit position shown in FIG. 5 to its right limit position, or vice versa. This causes a circular sliding movement of the movable current-carrying ing contacts relative to their cooperating fixed current-carrying contacts, and a like movement of the movable contacts of disconnects 7, 8, 9, 10, 11, 12 relative to their fixed cooperating contacts, and a like movement of the movable contacts of change-over switches 41, 42, 43 and u relative to their fixed contacts. It follows from the geometry of the contacts of disconnects 7, 8, 9, 10, 11, 12 that all disconnects are being closed simultaneously before the current-carrying contacts, or main contacts, 1, 2, 3 and 4, 5, 6, respectively, separate. It further follows from the geometry of the current-carrying contacts 1, 2, 3, 4, 5, 6 that only the first mentioned pairs of three current-carrying contacts 1, 2, 3 can be engaged, or the last mentioned three pairs of current-carrying contacts 4, 5, 6 can be engaged, but that there cannot be at any time an engagement of all the aforementioned pairs of current-carrying contacts. The lost motion connections associated with change-over switch 41, 42, 43 result in a time-lag when this change-over switch is operated, i.e. the change of connection of the forced commutation circuit 35, 37, 39 of FIG. 2 to bridge circuits DB1 and DB2 and to thyristors 29 and 30 is effected subsequent to each tap-changing operation.

To increase the voltage rating of the system of FIGS. 1–3 a plurality of serially connected thyristors may be substituted for each of the thyristors 29 and 30. In a like fashion, a plurality of thyristors connected in parallel may be substituted for each of the thyristors 20 and 30 of FIGS. 1–3 to increase the current switching capacity of the systems shown therein. FIG. 6 shows a network 66 including serially connected thyristors, and thyristors connected in parallel. Such a network may take the place of each of the thyristors 29 and 30 of FIGS. 1 to 3 in case that both the voltage between taps to be changed and the currents involved in tap-changing operations are high. In the network shown in FIG. 6 each thyristor is shunted by one of resistors 71, 72, 73, 74, 75, 76, and by one of capacitors 77, 78, 79, 80, 81, 82. These resistors and capacitors are means for controlling the voltage distribution in the thyristor network, the aforementioned resistors controlling the static voltage distribution, and the aforementioned capacitors controlling the dynamic, or transient, voltage distribution.

It will be apparent from FIG. 1 that a regulating transformer embodying this invention includes three tapped transformer winding U, V, W, and three conductor means 1', 2', 3' connected to establish a Y-connection between three corresponding taps $A_1$, $A_2$, $A_3$ of windings U, V, W. The regulating transformer of FIG. 1 further includes three additional conductor means 4', 5', 6' connected to establish a Y-connection between three other corresponding taps $B_1$, $B_2$, $B_3$ of windings U, V, W. A first group of cooperating separable pairs of load-current-carrying contacts 1, 2, 3 are interposed in conductor means 1', 2', 3', or form a part thereof. A second group of cooperating separable pairs of load-current-carrying contacts 4, 5, 6 are interposed in conductor means 4', 5', 6', or form a part thereof. Normally either the pairs of contacts 1, 2, 3, or the pairs of contacts 4, 5, 6, are in cooperative engagement and carry the load current of the regulating transformer. Reference characters DB1 has been applied to indicate the first three-phase diode rectifier bridge circuit including six diodes 13–18 and reference character DB2 has been applied to indicate the second diode rectifier bridge circuit including the diodes 19–24. The A-C input terminals of bridge circuit DB1 are adapted by conductor means including disconnects 10, 11, 12 to be conductively connected to taps $A_1$, $A_2$, $A_3$. The A-C input terminals of bridge circuit DB2 are adapted by conductors means including disconnects 10, 11, 12 to be conductively connected to terminals $B_1$, $B_2$, $B_3$. Diodes 25 and 26 interconnecting the D-C terminals of bridge circuit DB1 and diodes 27, 28 interconnecting the D-C terminals of bridge circuit DB2 are additional diodes, not normally found in diode rectifier bridge circuits. The conductor means Y' connects points situated between serially connected diodes 25, 26 and points situated between serially connected diodes 27, 28 to the neutral point of the Y-connected transformer windings U, V, W. Thyristor 29 is a first switch means and thyristor 30 is a second switch means. Thyristor 29 of FIG. 1 may be substituted by the mechanical switch 58 of FIG. 4 if the disconnect switch means 7–12 of FIG. 1 are replaced by the change-over switch means 52–57 of FIG. 3, in which case one of of two forced commutation circuits 35, 37, 39 and 36, 38, 40 of FIG. 1 can be dispensed with. As shown in FIG. 3 at least one forced commutation circuit (circuit 35, 37, 39) must always be present.

FIG. 1 shows clearly the connections to the gate circuits of load current thyristors 29, 30, and to auxiliary thyristors 39, 40 forming part of the two forced commutation circuits of FIG. 1. These connections are more fully set forth in one of the aforementioned copending patent applications.

In order to simplify the disclosure of this invention each of the transformer windings U, V, W has been shown as having but two adjacent taps. Actually the number of taps of each winding will be more than two. This calls for addition of a selector switch to the system of FIGS. 1 to 4. Such switches as well as the mode of connecting the same into a regulating transformer circuit are well known in the art and, therefore, do not need to be disclosed in this context. Regulating transformer circuits including transformer windings having a large number of taps and including selector switches are disclosed in U.S. Pat. 3,366,750 to A. Bleibtreu, issued Jan. 30, 1968, for Switching Mechanism for Tapped Regulating Transformers, and U.S. Pat. 3,366,763 to A. Bleibtreu et al., issued Jan. 30, 1968, for Reversing Switch for Tap-Changing Regulating Transformers. The above patents disclose combinations of tapped transformer windings, selector switches for selecting the taps intended to be connected to given circuit, and transfer switches for effecting tap-changing operations under load. The circuitry which is disclosed above is intended to take the place of the mechanical transfer switches forming part of the systems disclosed in the two aforementioned patents.

While there has been described and illustrated what is at present considered to be the preferred embodiment of the invention, it will be obvious to those skilled in the art that various changes and modifications may be made without departing from the invention and it is, therefore, aimed to cover all such changes and modifications as fall within the true spirit and scope of the invention.

I claim as my invention:
1. In a three-phase tap-changing regulating transformer the combination of:
 (a) three tapped transformer windings each having a plurality of taps;
 (b) three conductor means connected to establish a Y-connection between three corresponding taps of said windings and to establish a neutral point;
 (c) three additional conductor means connected to establish a Y-connection between three other corresponding taps of said windings and to establish a neutral point,
 (d) a first group of cooperating separable pairs of load-current-carrying contacts including three pairs of contacts each interposed in one of said three conductor means;
 (e) a second group of cooperating separable pairs of load-current-carrying contacts including three pairs of contacts each interposed in one of said three additional conductor means;
 (f) a first three-phase diode rectifier bridge circuit having three A-C input terminals each adapted to be conductively connected to one of said three corresponding taps of said three windings and having D-C output terminals;
 (g) a second three-phase diode rectifier bridge circuit having three A-C input terminals each adapted to be conductively connected to one of said three other corresponding taps of said three windings and having D-C output terminals;
 (h) a first pair of additional serially connected diodes interconnecting said D-C output terminals of said first rectifier bridge circuit;
 (i) a second pair of additional serially connected diodes interconnecting said D-C output terminals of said second rectifier bridge circuit;
 (j) conductors connecting a point situated between said first pair of additional diodes and conductors for connecting a point situated between said second pair of additional diodes to said neutral point;

(k) a first switch means for conductively interconnecting said D-C terminals of said first rectifier bridge circuit, and a second switch means for conductively interconnecting said D-C terminals of said second rectifier bridge circuit, are least one of said switch means being a load current thyristor, a first current-limiting choke being connected in series with said load current thyristor;

(l) means for controlling said first switch means and means for controlling said second switch means to establish a short-circuit across the portion of each of said windings situated between one of said three corresponding taps and one of said three additional corresponding taps; and (m) a forced commutation circuit for forcing the current flow in said load current thyristor down to zero, said forced commutation circuit including an auxiliary thyristor, a commutation capacitor and a second current-limiting choke connected in series with said auxiliary thyristor and said commutation capacitor.

2. A three-phase tap-changing regulating transformer as specified in claim 1 wherein:

(a) said first switch means and said second switch means are load current thyristors, a first current-limiting choke being connected in series with each of said load current thyristors, each of said load current thyristors being operatively related to a forced commutation circuit for forcing the current flow in each of said load-current thyristors down to zero, said forced commutation circuit of each of said load thyristors including an auxiliary thyristor, a commutation capacitor and a second current-limiting choke connected in series with said auxiliary thyristor and said commutation capacitor;

(b) a disconnect switch is interposed between each of said three corresponding taps of said three windings and one of said three A-C input terminals of said first rectifier bridge circuit; and (c) a disconnect switch is interposed between each of said three other corresponding taps of said windings and one of said three A-C input terminals of said second rectifier bridge circuit.

3. A three-phase tap-changing regulating transformer as specified in claim 1 wherein:

(a) a first disconnect switch is interposed between each of said three corresponding taps of said three windings and one of said three A-C input terminals of said first rectifier bridge circuit;

(b) a second disconnect switch is interposed between each of said three other corresponding taps of said three windings and one of said three A-C input terminals of said second rectifier bridge circuit;

(c) said first switch means and said second switch means are load-current thyristors, a current-limiting choke being connected in series with each of said load-current thyristors; and (d) said load-current thyristors are operatively related to a change-over switch to selectively relate said forced commutation circuit to each of said load current thyristors to make it possible to force the current flow in each of said load-current thyristors down to zero by the same forced commutation circuit.

4. A three-phase tap-changing regulating transformer as specified in claim 1 wherein:

(a) a three-phase change-over switch is operatively related to said first diode rectifier bridge circuit for selectively connecting each of said three A-C input terminals thereof to one of said three corresponding taps of said windings and to one of said three other corresponding taps of said windings;

(b) a three-phase change-over switch is operatively related to said second diode rectifier bridge circuit for selectively connecting each of said three A-C input terminals thereof to one of said three other corresponding taps of said windings and to one of said three corresponding taps of said windings;

(c) said first switch means and said second switch means are load current thyristors, a current-limiting choke being arranged in series with each of said load current thyristors; and (d) said forced commutation circuit is operatively related to but one of said load-current thyristors.

5. A three-phase tap-changing regulating transformer as specified in claim 1 wherein:

(a) a three-phase change-over switch is operatively related to said first diode rectifier bridge circuit for selectively connecting each of said three A-C input terminals thereof to one of said three corresponding taps and to one of said three other corresponding taps of said windings;

(b) a three-phase change-over switch is operatively related to said second diode rectifier bridge circuit for selectively connecting each of said three A-C input terminals thereof to one of said three other corresponding taps of said windings and to one of said three corresponding taps of said windings;

(c) said first switch means is a load-current thyristor, a current-limiting choke being arranged in series with said thyristor;

(d) said second switch means is a mechanical switch having relatively movable contacts; and (e) said forced commutation circuit is operatively related to said load-current thyristor.

6. A three-phase tap-changing regulating transformer as specified in claim 1 wherein a diode is connected across the terminals of said first current-limiting choke to establish a circuit for dissipating energy stored in said first current-limiting choke.

7. A three-phase tap-changing regulating transformer as specified in claim 3 including a power operated integral switch mechanism having one single source of operating power for operating said first group of load current-carrying contacts and for operating said second group of load current-carrying contacts, for operating said first disconnect switch, for operating said second disconnect switch, for operating said change-over switch to selectively relate said forced commutation circuit to each of said load current thyristors and to control the gate circuits of said load current thyristors.

8. In a three-phase tap-changing regulating transformer the combination of:

(a) three tapped transformer windings each having a plurality of taps including a pair of adjacent taps in each of said windings;

(b) means for Y-connecting one of said pair of adjacent taps of each of said windings to establish a neutral point, said Y-connecting means including three conductors of current and three pairs of cooperating separable load-current-carrying contacts each interposed in one of said conductors of current;

(c) means for Y-connecting the other of said pair of adjacent taps of each of said windings to establish a neutral point, said Y-connecting means including three additional conductors of current and additional pairs of cooperating separable load-current-carrying contacts each interposed in one of said additional conductors of current;

(d) a first three-phase diode rectifier bridge circuit having three A-C input terminals each connectable to one of said pair of taps of each of said windings by the intermediary of one of three disconnects, said first bridge circuit further having D-C terminals interconnected by a first pair of additional serially connected diodes;

(e) a second three-phase diode rectifier bridge circuit having three A-C input terminals each connectable to the other of said pair of taps of each of said windings by the intermediary of three additional disconnects, said second bridge circuit further having D-C terminals interconnected by a second pair of additional serially connected diodes;

(f) conductor means for connecting a point situated between said first pair of additional diodes and conductor means for connecting a point situated between said second pair of additional diodes to said neutral point;

(g) a first load current thyristor and a serially connected current-limiting choke connected across said D-C terminals of said first bridge circuit;

(h) a second load-current thyristor and a serially connected current-limiting choke connected across said D-C terminals of said second bridge circuit;

(i) a first forced commutation circuit operatively related to said first load-current thyristor; and (j) a second forced commutation circuit operatively related to said second load-current thyristor.

9. In a three-phase tap-changing regulating transformer the combination of:

(a) three tapped transformer windings each having a plurality of taps including a pair of adjacent taps in each of said windings;

(b) means for Y-connecting one of said pair of adjacent taps of each of said windings to establish a neutral point, said Y-connecting means including three conductors of current and three pairs of cooperating separable load-current-carrying contacts each interposed in one of said conductors of current;

(c) means for Y-connecting the other of said pair of adjacent taps of each of said windings to establish a neutral point, said Y-connecting means including three aditional conductors of current and three additional pairs of cooperating separable load-current-carrying contacts each interposed in one of said additional conductors of current;

(d) a first three-phase diode rectifier bridge circuit having three A-C input terminals each connectable to one of said pair of taps of each of said windings by the intermediary of one of three disconnects, said first bridge circuit further having D-C terminals interconnected by a first pair of additional serially connected diodes;

(e) a second three-phase diode rectifier bridge circuit having three A-C input terminals each connectable to the other of said pair of taps of each of said windings by the intermediary of one of three additional disconnects, said second bridge circuit further having D-C terminals interconnected by a second pair of additional serially connected diodes;

(f) conductor means for connecting a point situated between said first pair of additional diodes and conductor means for connecting a point between said second pair of additional diodes to said neutral point;

(g) a first load-current thyristor and a serially connected current-limiting choke connected across said D-C terminals of said first bridge circuit;

(h) a second load-current thyristor and a serially connected current-limiting choke connected across said D-C terminals of said second bridge circuit;

(i) a forced commutation circuit for said first load-current thyristor and for said second load-current thyristor; and (j) a change-over switch for operatively relating said forced commutation circuit with said first load-current thyristor and with said second load-current thyristor.

10. In a three-phase tap-changing regulating transformer the combination of:

(a) three tapped transformer windings each having a plurality of taps including a pair of adjacent taps in each of said windings;

(b) means for Y-connecting one of said pair of adjacent taps of each of said windings to establish a neutral point, said Y-connecting means including three conductors of current and three pairs of cooperating separable load-current-carrying contacts each interposed in one of said conductors of current;

(c) means for Y-connecting the other of said pair of adjacent taps of each of said windings to establish a neutral point, said Y-connecting means including three additional conductors of current and three additional pairs of cooperating separable load-current-carrying contacts each interposed in one of said additional conductors of current;

(d) a first three-phase diode rectifier bridge circuit having three A-C input terminals each selectively connectable to one of said pair of taps of each of said windings and to the other pair of taps of each of said windings by the intermediary of three pairs of change-over switch contacts, said first bridge circuit further having D-C terminals interconnected by a first pair of additional serially connected diodes;

(e) a second three-phase diode rectifier bridge circuit having three A-C input terminals selectively connectable to said other of said pair of taps of said windings and to said one of said pair of taps of said windings by the intermediary of three pairs of change-over switch contacts, said second bridge circuit further having D-C terminals interconnected by a second pair of additional serially connected diodes;

(f) conductor means for connecting a point situated between said first pair of additional diodes and conductor means for connecting a point situated between said second pair of additional diodes to said neutral point;

(g) a load current thyristor and a serially connected current-limiting choke connected across said D-C terminals of said first bridge circuit;

(h) a forced commutation circuit for said load-current thyristor; and (i) a switch having cooperating contacts connected across said D-C terminals of said second bridge circuit.

References Cited
UNITED STATES PATENTS

| | | | |
|---|---|---|---|
| 2,539,190 | 1/1951 | Hibbard | 323—43.5 X |
| 3,340,462 | 9/1967 | Ebersohl | 323—43.5 |
| 3,358,219 | 12/1967 | Bühler | 323—43.5 |

J. D. MILLER, Primary Examiner

A. D. PELLINEN, Assistant Examiner